(12) United States Patent
Shimoda et al.

(10) Patent No.: US 7,722,921 B2
(45) Date of Patent: May 25, 2010

(54) ANTI-REFLECTION FILM PRODUCING METHOD AND APPARATUS

(75) Inventors: Kazuhiro Shimoda, Kanagawa (JP); Hirokazu Nishimura, Kanagawa (JP); Makoto Satoh, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 285 days.

(21) Appl. No.: 11/790,165

(22) Filed: Apr. 24, 2007

(65) Prior Publication Data

US 2007/0253062 A1    Nov. 1, 2007

(30) Foreign Application Priority Data

Apr. 26, 2006   (JP) .............................. 2006-122062

(51) Int. Cl.
*B05D 3/02* (2006.01)
(52) U.S. Cl. ...................... 427/162; 427/164; 427/493; 427/494; 427/379
(58) Field of Classification Search ........................ None
See application file for complete search history.

(56) References Cited

U.S. PATENT DOCUMENTS 6,387,517 B1 * 5/2002 Belleville et al. ........... 428/447

2004/0156983 A1 * 8/2004 Moravec et al. ............. 427/162
2005/0095420 A1 * 5/2005 Berni et al. .................. 428/323
2006/0275611 A1 * 12/2006 Nishimura ................... 428/426
2007/0048457 A1 * 3/2007 Ando et al. .................. 428/1.1

FOREIGN PATENT DOCUMENTS

| JP | 9-145903 A | 6/1997 |
| JP | 2001-170547 A | 6/2001 |
| JP | 2003-311911 A | 11/2003 |
| JP | 2005-257786 A | 9/2005 |
| WO | WO 2005/063484 A1 | 7/2005 |

* cited by examiner

*Primary Examiner*—Erma Cameron
(74) *Attorney, Agent, or Firm*—Sughrue Mion, PLLC (57) ABSTRACT

Anti-reflection film includes a transparent support, at least one optical functional layer overlaid on the support, and a low refractive index layer, overlaid on the optical functional layer, and having a lower refractive index than the optical functional layer. An anti-reflection film producing apparatus to produce this includes a coater for coating a surface of the optical functional layer with liquid for forming the low refractive index layer, to form a coating layer. A dryer promotes drying of the coating layer. A heater hardens the coating layer from the dryer at a first temperature level, and then hardens the coating layer at a second temperature level higher than the first temperature level, to form the low refractive index layer. Preferably, a difference between the first and second temperature levels is 1-50 deg. C. Also, ultraviolet rays are applied to the low refractive index layer after the hardening of the heater.

13 Claims, 3 Drawing Sheets

ANTI-REFLECTION FILM PRODUCING METHOD AND APPARATUS

BACKGROUND OF THE INVENTION

1. Field of the Invention

The present invention relates to an anti-reflection film producing method and apparatus. More particularly, the present invention relates to an anti-reflection film producing method and apparatus in which anti-reflection film can be produced with hard coat layers with high quality in an easy manner.

2. Description Related to the Prior Art

An optical film as an optical element is used as a main component for image display panels, for example, LCD (liquid crystal display), PDP (plasma display panel), ELD (electroluminescence display panel) and CRT (cathode ray tube). The optical film according to well-known techniques includes a transparent support, an optical functional layer, and a protective layer with physical strength. The protective layer operates to keep a high resistance to scratches for the optical film. Materials and combinations of the layers are selectively determined, to construct various types of optical films, such as an anti-reflection film, anti-glare film, optical compensatory film, surface producing film and the like.

The anti-reflection film is used for the purpose of raising clear display property suitable for recognition of the display panel. As the display panel is observed directly by human eyes, failure of appearance of the anti-reflection film, such as color defects and color unevenness, should be suppressed. Required quality of the anti-reflection film has become higher and higher according to the tendency of a larger screen size, higher brightness and higher precision in the field of the display panel.

Important properties of the anti-reflection film include the resistance to scratches, resistance to abrasion, a dust-proof property of small possibility of residual fingerprint, mark of water droplets or the like in consideration of the use for an image display. The resistance to scratches among those is important because irrecoverable defect occurs with scratches of the display surface to lower the image quality of the image display panel. In view of this, JP-A 9-145903 discloses an example of the anti-reflection film of which a low refractive index layer is positioned as an outer layer, and is formed from an optically curable resin composition, and contains fine particles, for the purpose of high resistance to scratches.

In general, the anti-reflection film is formed by applying a coating of a predetermined solution to a support, and by drying a layer of the coating. In addition to the high quality of the coating layer, high productivity is important by means of reduction of the production time or the like. To this end, a coating solution is prepared by mixture of compounds for the functional layer and an organic solvent, for the purpose of facilitating the application of the coating and of shortening the drying time. However, the coating layer immediately after the coating is fluctuated or unevenly dried by shock or vibration in the transport or by an unwanted air flow, so unevenness in the thickness of the coating layer will occur to cause failure in the appearance.

WO-A 2005-063484 (corresponding to JP-A 2005-257786) discloses suggestion for imparting high resistance to scratches and the high dust-proof property and also with high productivity of the anti-reflection film. A coating layer in the anti-reflection film of this document contains additives and fine particles of hardenable resin, fluorine compounds, silicone compounds and the like having a surface activity. Ionizing radiation is applied to the coating layer to form the low refractive index layer.

Also, a multi layer structure of the anti-reflection film is widely used, and includes a support, a hard coat layer and the low refractive index layer. A property of high adhesion on interfaces between the layers is required for the purpose of anti-reflection effect by preventing scatter of light. JP-A 2003-311911 discloses production of the anti-reflection film of which adhesion between the layers can be tight. For a layer next to the support, a hardenable resin having a reactive functional group is used. Also, hardening condition is adjusted.

It is possible according to JP-A 9-145903 and 2003-311911 to obtain the anti-reflection film having high resistance to scratches and high adhesion on interfaces between the layers. However, dust-proof property and productivity cannot be high. The techniques of all of those three documents have a problem of occurrence of powder-like white material on the surface of the protective layer over the optical functional layer to lower the quality of the appearance. It is impossible according to the prior art to produce the anti-reflection film with high resistance to scratches and reduced failure in the appearance also at a high productivity.

SUMMARY OF THE INVENTION

In view of the foregoing problems, an object of the present invention is to provide an anti-reflection film producing method and apparatus in which anti-reflection film can be produced with hard coat layers with high quality in an easy manner.

In order to achieve the above and other objects and advantages of this invention, an anti-reflection film producing method of producing anti-reflection film is provided, the anti-reflection film including a transparent support, at least one optical functional layer overlaid on the support, and a low refractive index layer, overlaid on the optical functional layer, and having a lower refractive index than the optical functional layer. The anti-reflection film producing method includes a coating step of coating a surface of the optical functional layer with liquid for forming the low refractive index layer, to form a coating layer. In the anti-reflection film producing method, there is a drying step of promoting drying of the coating layer. In a hardening step, the coating layer is thermally hardened after promoting of drying, to form the low refractive index layer. The hardening step includes a first heating step of heating the coating layer at a first temperature level for hardening. In a second heating step, the coating layer is heated at a second temperature level for hardening higher than the first temperature level.

Furthermore, there is a step of applying ionizing radiation to the low refractive index layer after the hardening step.

A difference between the first and second temperature levels is equal to or higher than 1 deg. C. and equal to or lower than 50 deg. C.

In the drying step, dry gas is blown to the coating layer. In the first and second heating steps, heated gas conditioned at respectively the first and second temperature levels is blown to the coating layer.

The optical functional layer contains at least one of a fluorine compound and a silicone compound having surface activity.

The optical functional layer is an anti-glare functional layer.

The optical functional layer has a refractive index equal to or more than 1.58 and equal to or less than 2.0.

The low refractive index layer has a refractive index equal to or more than 1.31 and equal to or less than 1.45.

The anti-reflection film further includes light transmitting fine particles contained in at least one of the optical functional layer and the low refractive index layer.

The first temperature level is equal to or higher than 70 deg. C. and equal to or lower than 110 deg. C.

The second temperature level is equal to or higher than 100 deg. C. and equal to or lower than 160 deg. C.

The at least one optical functional layer is at least first and second layers positioned in a sequence from the support.

The anti-reflection film further includes light transmitting fine particles contained in the second layer.

At least one optical functional layer is at least first to third layers positioned in a sequence from said support.

In each of the first and second heating steps, a plurality of transport rollers are used to guide web of the anti-reflection film with a U-shaped bend for transport.

Also, an anti-reflection film producing apparatus for producing anti-reflection film is provided, the anti-reflection film including a transparent support, at least one optical functional layer overlaid on the support, and a low refractive index layer, overlaid on the optical functional layer, and having a lower refractive index than the optical functional layer. The anti-reflection film producing apparatus includes a coater for coating a surface of the optical functional layer with liquid for forming the low refractive index layer, to form a coating layer. A dryer promotes drying of the coating layer. A heater hardens the coating layer from the dryer at a first temperature level, and then hardens the coating layer at a second temperature level higher than the first temperature level, to form the low refractive index layer.

The dryer includes a drying chamber for passage of web of the anti-reflection film being transported, and for blowing dry gas to the coating layer. The heater includes first and second heating chambers for passage of the web being transported, and for blowing heated gas conditioned at respectively the first and second temperature levels to the coating layer.

Furthermore, a plurality of transport rollers are contained in each of the first and second heating chambers, for guiding the web with a U-shaped bend for transport.

Therefore, anti-reflection film can be produced with hard coat layers with high quality in an easy manner, because of the use of the two temperature levels for hardening.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
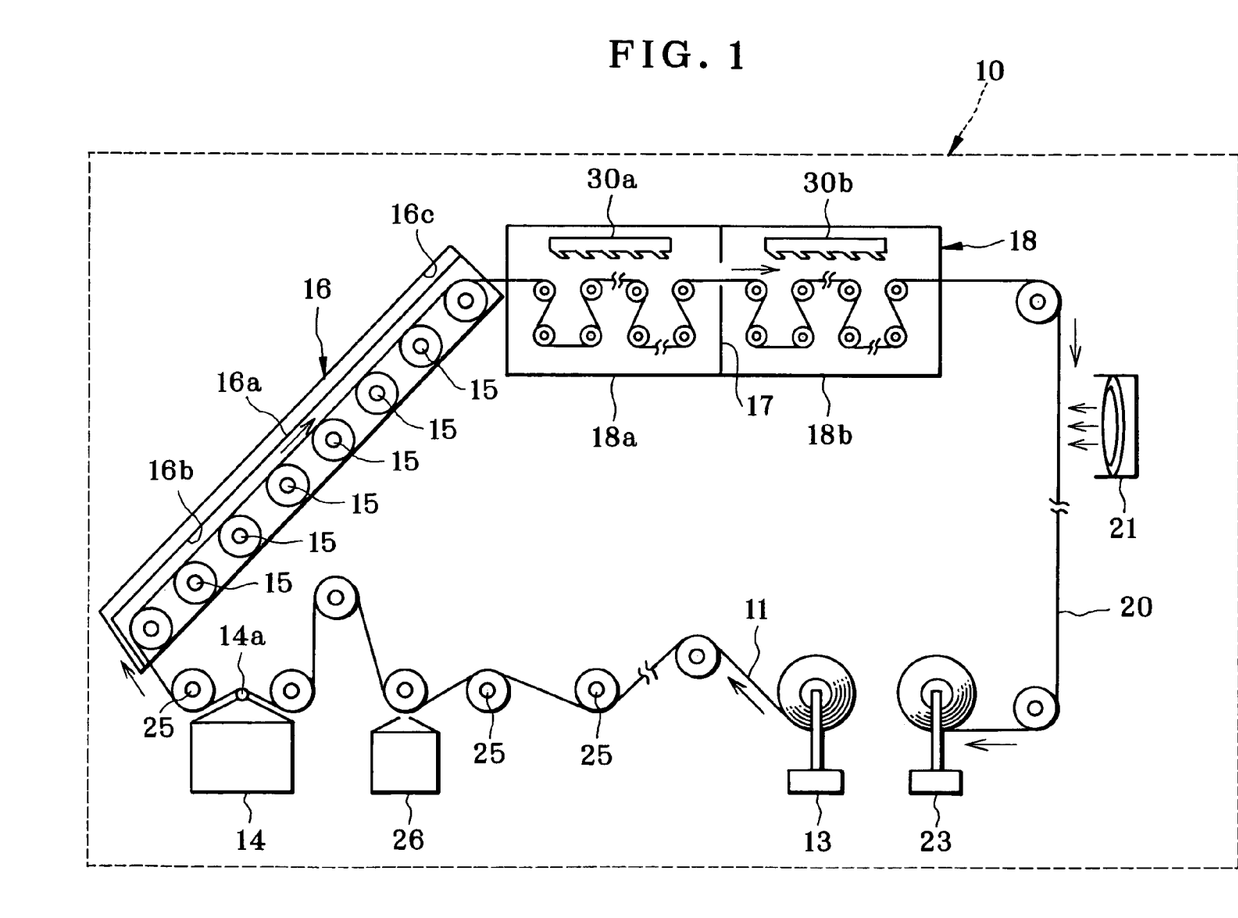
FIG. 1 is an explanatory view illustrating an optical film producing system.

Production of anti-reflection film according to the invention is described. The invention is not limited to examples hereinafter described. In FIG. 1, an optical film producing system 10 is illustrated.

The optical film producing system 10 includes a polymer film delivery device 13, a coater 14, a dryer 16, a heater 18, an ultraviolet curing lamp 21, and a winder 23. The polymer film delivery device 13 supplies web of polymer film as a base film 11. The coater 14 applies a coating to the web 11 by supplying a coating liquid. The dryer 16 includes a plurality of pass rollers 15, and dries a coating layer. The heater 18 applies heat to the coating layer for thermal hardening, and includes a first heating chamber 18a and a second heating chamber 18b, which a partition 17 defines inside the heater 18. The ultraviolet curing lamp 21 applies ultraviolet rays to the coating layer for finally hardening in order to obtain an anti-reflection film 20. The winder 23 winds the anti-reflection film 20. Also, the optical film producing system 10 includes numerous transport rollers 25 and a dust eliminator 26.

The coater 14 includes a micro gravure roll 14a and a solution tank (not shown) under a path for the web or base film 11. The micro gravure roll 14a has a gravure pattern. The micro gravure roll 14a is used to apply a coating of the solution to one surface of the web 11. As the solution tank is disposed under the micro gravure roll 14a and so positioned that a surface of the micro gravure roll 14a can contact the solution. The surface of the micro gravure roll 14a is caused to contact the solution in the tank, and supplies the gravure pattern with the solution. A doctor blade (not shown) is disposed near to the micro gravure roll 14a, and removes surplus solution from the micro gravure roll 14a. An amount of the solution supplied to the micro gravure roll 14a can be adjusted.

The dryer 16 includes a drying chamber 16b for transport and a vent chamber 16c with a dry gas source. There is an aperture panel 16a disposed between the drying chamber 16b and the vent chamber 16c, to adjust a flow. The aperture panel 16a is formed from metal, includes plural openings, is a partition between the drying chamber 16b and the vent chamber 16c in a state of allowing flow of gas. Preferable examples of the aperture panel 16a are a mesh of metal, punching metal or the like. An opening ratio of the aperture panel 16a is 50% or lower, and preferably equal to or more than 20% and equal to or less than 40%. In the embodiment, the mesh of the metal is used, and has an opening ratio of 30% and has a grade of 300 mesh. The aperture panel 16a is preferably disposed at a distance of 10 mm from the surface of the web or base film 11.

A plurality of the pass rollers 15 are disposed in the drying chamber 16b for supporting and transporting the web or base film 11. It is preferable that the pass rollers 15 are removably disposed, and are incorporated in an easily exchangeable manner. If the content of the residual solvent on the coating solution on the web 11 is equal to or more than 20% and equal to or less than 45%, the web 11 is transported in a non-contact manner by removing the pass rollers 15. This is effective in keeping the flatness without lowering while the web 11 is transported.

An exit conduit and an entrance conduit (not shown) are connected with the vent chamber 16c. The exit conduit causes air to flow out of the vent chamber 16c. As dry gas source, the entrance conduit is positioned opposite to the exit conduit in the width direction of the web or base film 11. The air of the vent chamber 16c is circulated by use of the exit conduit and the entrance conduit. The dry gas source introduces heated dry air through the entrance conduit into the vent chamber 16c, to adjust the inner temperature suitably. Thus, drying of the coating layer of the web 11 transported in the drying chamber 16b can be promoted. Note that dry gas for drying may be any gas other than air, and can be suitably selected for the purpose.

Gas flow ducts 30a and 30b as gas source are connected with the inside of the heating chambers 18a and 18b defined by the partition 17 in the heater 18 for temperature control. The material and form of the partition 17 are not limited. A preferable material for the partition 17 has small heat conductivity. For the temperature control, an adjustable heater can be used for setting the inner temperature at an adjusted level. In the optical film producing system 10, the transport rollers 25 are disposed for supporting and transporting the web or base film 11. The positions and number of the transport rollers 25 are not limited, and can be determined in compliance with the purpose.

Production of the optical film in the optical film producing system 10 is hereinafter described.

Figure 2A:
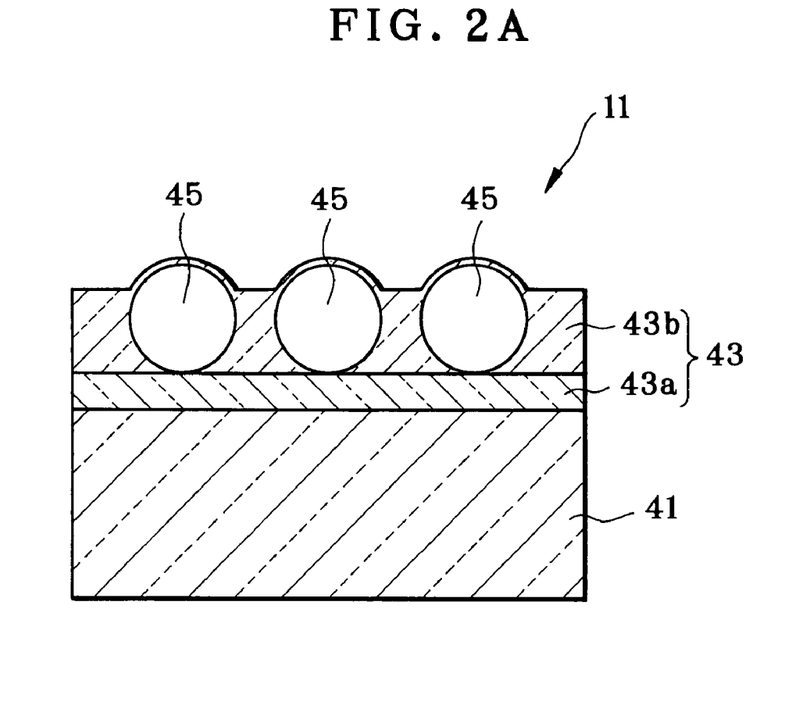
FIG. 2A is a cross section illustrating web or base film.

At first, the web or base film 11 is advanced from the polymer film delivery device 13. In FIG. 2A, the web 11 includes a transparent support 41 and an optical functional layer 43. The optical functional layer 43 includes a first layer 43a or a hard coat layer, and a second layer 43b or an anti-glare hard coat layer. Light transmitting fine particles 45 or microspheres are contained in the second layer 43b. The material and structure of the web 11 are not limited. The support 41 for the web 11 can be a commercially available polymer film. The types of the first and second layers 43a and 43b are not limited. However, the first layer 43a of the embodiment is the hard coat layer, the second layer 43b being the anti-glare hard coat layer for the purpose of obtaining the anti-reflection film 20. The light transmitting fine particles 45 will be described later in detail.

While the transport rollers 25 transport the web or base film 11 advanced from the polymer film delivery device 13, gas is blown to the web 11 by the dust eliminator 26. Dust or other foreign matter or impurity on the web 11 can be eliminated. Possible depositing of dust during forming the coating layer can be reduced effectively. Note that the position, number and the like of the dust eliminator 26 are not limited. However, it is preferable to position the dust eliminator 26 upstream from the coater 14, and very near to the coater 14 in view of maximizing the effect in the above description.

The web or base film 11 after the dust elimination is transported, and coated with a solution by the coater 14. The micro gravure roll 14a of the coater 14 rotates in a direction reverse to the transport direction of the web 11. A gravure pattern of the micro gravure roll 14a is supplied with coating solution of a suitable amount. When the micro gravure roll 14a contacts the web 11, solution is transferred to the web 11, easily to form a coating layer on the surface of the web 11 for an intended purpose. In the embodiment, the web 11 is coated with a solution for a layer of which a refractive index will be lower than that of the optical functional layer 43, so as to form a low refractive index layer.

The number of lines of the gravure pattern formed on the micro gravure roll 14a is equal to or higher than 50 per inch and equal to or lower than 800 per inch, and preferably equal to or higher than 100 per inch and equal to or lower than 300 per inch. The depth of the gravure pattern is equal to or more than 1 micron and equal to or less than 600 microns, and preferably equal to or more than 5 microns and equal to or less than 200 microns. The rotational speed of the micro gravure roll 14a is equal to or higher than 3 rpm and equal to or lower than 800 rpm, and preferably equal to or higher than 5 rpm and equal to or lower than 200 rpm. The transport speed of the web or base film 11 is equal to or higher than 0.5 meter per minute and equal to or lower than 100 meters per minute, and preferably is equal to or higher than 1 meter per minute and equal to or lower than 50 meters per minute. Thus, the surface of the web 11 can be coated at a regularized thickness without great unevenness.

The amount of the coating solution is not limited, and can be determined by considering the target thickness of the coating layer and prevention of the creation of a crawling defect on the web or base film 11. Should the amount be too great, crawling defect may occur on the web 11, or the drying time may be too long. The same problem will occur also when the coating layer is too thick. To solve the problem, the amount of the coating solution is equal to or more than 1 milliliter and equal to or less than 40 milliliters per sq. meter of the base film, and specifically equal to or more than 2 milliliters and equal to or less than 25 milliliters per sq. meter. A thickness of the coating layer is equal to or more than 0.01 micron and equal to or less than 20 microns, and preferably equal to or more than 0.05 micron and equal to or less than 10 microns for the purpose of preventing drying from taking too much time before obtaining a desired layer property.

The web or base film 11 moved in the dryer 16 is supported and transported by the pass rollers 15 through the drying chamber 16b in contact of the pass rollers 15 with a back surface of the web 11 reverse to the coated surface. A blower conduit (not shown) of the dryer 16 causes dry gas to flow in the dryer 16 at a controlled temperature, so that the inner temperature of the dryer 16 is suitably adjusted. Initial drying can be made to promote drying of the coating layer. The inner temperature of the dryer 16 is equal to or higher than 20 deg. C. and equal to or lower than 120 deg. C., and preferably equal to or higher than 25 deg. C. and equal to or lower than 100 deg. C. Drying of the coating layer can proceed without heat shrinkage. Should the inner temperature of the dryer 16 be lower than 20 deg. C., the solvent in the coating layer does not sufficiently evaporate. The coating layer containing much solvent will be heated in the heater 18. As a result, solvent in the coating layer will evaporate abruptly in the heater 18, so failure in appearance will occur seriously due to considerable irregularity in the drying or thickness. Should the inner temperature of the dryer 16 be higher than 120 deg. C., the solvent in the coating layer evaporates abruptly in the dryer 16. Heat shrinkage of the coating layer is likely to occur. The formed layer is likely to fail to have desired property because additives may evaporate together with the evaporation of the solvent.

It is preferable that a temperature adjuster is associated with the pass rollers 15 for adjusting the temperature of the roller surfaces. This makes it possible to dry the coating layer efficiently. Specifically, the temperature of the roller surface of the pass rollers 15 should be adjusted at a level of the inner temperature of the dryer 16 so as to suppress unevenness in the drying of the coating layer.

A flow rate of the gas in the drying chamber 16b is equal to or higher than 0.1 meter per second and equal to or lower than 1.5 meters per second. The flow rate is preferably equal to or higher than 0.1 meter per second and equal to or lower than 1.0 meter per second, and desirably equal to or higher than 0.2 meter per second and equal to or lower than 1.0 meter per second. This makes it possible in the dryer 16 to dry the coating layer initially at a high efficiency suitably by preventing failure in forming of the appearance. If the flow rate is equal to or lower than 0.1 meter per second, initial drying of the coating layer will be insufficient because of very low efficiency. The coating layer containing much solvent in the heater 18 is dried, so the solvent evaporates abruptly to create unevenness in drying or thickness in the coating layer. Should the drying chamber 16b be very long for sufficient drying, a manufacturing cost will be too high, or drying efficiency will be too low. Should the flow rate be higher than 1.5 meters per second, unevenness in the thickness of the coating layer is likely to occur.

The web or base film 11, after the initial drying of the coating layer, is advanced from the dryer 16, and transported to the heater 18. Dry air as dry gas supplied through the gas flow ducts 30a and 30b is adjusted for its gas temperature. The heated dry gas flows to regulate the inner temperature of the heating chambers 18a and 18b within predetermined ranges.

The first temperature level of the first heating chamber 18a is preferably equal to or more than 70 deg. C. and equal to or less than 110 deg. C. Desirably, the first temperature level can be equal to or more than 90 deg. C. and equal to or less than 100 deg. C. The second temperature level of the second heating chamber 18b is preferably equal to or more than 100 deg. C. and equal to or less than 160 deg. C. Desirably, the second temperature level can be equal to or more than 100 deg. C. and equal to or less than 140 deg. C. The second temperature level is set higher in the heater 18 than the first temperature level. A preferable difference between the first and second temperature levels is equal to or more than 1 deg. C. and equal to or less than 50 deg. C. In the invention, the coating layer after the initial drying is dried at least two temperature levels to form the low refractive index layer. Thus, reaction of the later curing of the coating layer can be promoted in thermosetting of the coating layer and with suppression of the elution and release of the additives. It is possible to obtain a very hard coating layer and to prevent creation of powder-like white deposit due to release of the additives. As a result, forming of the low refractive index layer is possible with high resistance to scratch and without failure in the appearance.

If the first temperature level is lower than 70 deg. C. or if the second temperature level is lower than 100 deg. C., the heat is completely insufficient for promoting of the thermal hardening of the coating layer. Should the transport speed of the web or base film 11 be low or should the transport path be long for adequacy the hardening, serious problems will arise. For example, productivity will be low according to the very long time of the transport. The web 11 may be damaged thermally by stay in the heater 18 for a long time. Also, the manufacturing cost will be high according to the larger apparatus. If the first temperature level is higher than 110 deg. C. or if the second temperature level is higher than 160 deg. C., it is very likely that additives contained in the coating layer will release on the coating surface by elution, to create wrinkles, streak or other failure upon thermal contraction of the coating layer.

Note that a preferable inner temperature of the dryer 16 is 20-120 deg. C. as described above. However, a relationship between the inner temperature of the dryer 16 and the first or second temperature levels of the heater 18 is not limited, and can be determined suitably for the purpose.

Ultraviolet rays are applied to the web or base film 11 initially hardened by the heater 18 on a surface of the low refractive index layer. It is possible to obtain a layer with an extremely high hardness by applying ionizing radiation, because hardening is reinforced by curing. Note that ionizing radiation of the invention is ultraviolet rays, electron beam radiation, X rays, gamma rays, high speed neutron radiation, high speed charged particles, and the like for ionization of substance of the surface. The anti-reflection film 20 is finally wound by the winder 23. Note that the final form of the anti-reflection film 20 can be a film roll or bulk, or sheets or other shapes.

Figure 2B:
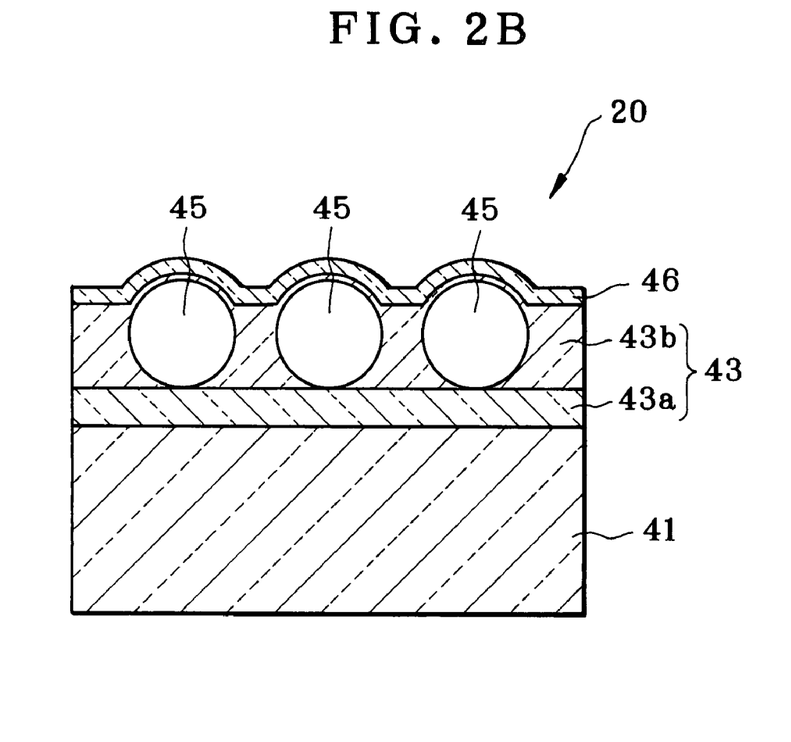
FIG. 2B is a cross section illustrating anti-reflection film.

In FIG. 2B, a low refractive index layer 46 is formed on the web or base film 11 in the anti-reflection film 20 formed by the method above. The anti-reflection film 20 is thermally hardened after the initial drying. The low refractive index layer 46 is formed by the ultraviolet curing after the thermal hardening. Thus, the anti-reflection film 20 can be free from failure in the appearance, and can have high resistance to scratches.

The anti-reflection film of the invention is described now. The support 41 is transparent film, is formed from polymer, and has suitability for forming plural layers of coatings. Examples of the polymer include cellulose esters, polyamides, polycarbonates, polyesters, polystyrene, polyolefins, norbornene resins, and amorphous polyolefins. Among those, preferable examples are triacetyl cellulose as cellulose ester, and polyethylene terephthalate and polyethylene naphthalate as polyesters. Specifically, triacetyl cellulose (TAC) is preferable.

The optical functional layer 43 operates optically, and contains at least one layer component formed from a binder, polymerization initiator, dispersion agent or other polymers. The optical functional layer 43 may have a multi layer structure having two or more layer components. In the embodiment, those are the first and second layers 43a and 43b. Example of layer components for constituting functional layers are light diffusion layer, middle refractive index layer, high refractive index layer, optical compensatory layer, anti-glare functional layer, and the like. Layer components included in the optical functional layer 43 may be a material of a common composition, or materials of different compositions. The optical functional layer 43 can be formed by selection from such examples according to the purpose. In particular, the anti-glare functional layer should be included for the purpose of ensured prevention of reflection.

Preferable binders for the optical functional layer 43 are polymers containing a saturated hydrocarbon chain or polyether chain as a main chain. Various substances are selectable for adjusting a refractive index of a layer to be formed, by selectively determining a structure of a monomer, existence or lack of aromatic rings, and existence or lack of atoms of halogen, sulfur, phosphorus, nitrogen and the like.

The light transmitting fine particles 45 are added to the second layer 43b. The term of light transmission in the light transmitting fine particles 45 is herein used for the property without absorption in the visible light range. Addition of the light transmitting fine particles 45 in the layer makes it possible to adjust the refractive index easily, and to adjust the anti-glare property of the layers because of light transmission of the light transmitting fine particles 45. For the light transmitting fine particles 45, U.S. Pat. Pub. No. 2004/240070, paragraph 0085 (corresponding to JP-A 2003-302506, paragraph 0044) discloses specific examples, which can be used in the present invention. Materials of the light transmitting fine particles 45 can be suitably selected by considering differences in the refractive indexes of the layers to be formed.

Light transmitting fine particles can be selectively used by considering differences in the refractive index, particle diameter and the like, to control various characteristics of the formed layers. If light transmitting fine particles with a great diameter is used, the anti-reflection property of the layer can be adjusted easily. If light transmitting fine particles with a small diameter is used, the refractive index of the layer can be adjusted easily. It is preferable in combination to use two or more examples of light transmitting fine particles with differences in the type, size or the like. If unevenness of the film surface to lower the uniformity of the brightness remains, such a problem can be solved by using the light transmitting fine particles at a suitably determined particle diameter.

The optical functional layer 43 is formed by suitably selecting the material of the particles. The refractive index of the optical functional layer 43 is preferably equal to or more than 1.58 and equal to or less than 2.0. The refractive index of the low refractive index layer 46 is preferably equal to or more than 1.31 and equal to or less than 1.45. The optical functional layer 43 thus formed can have a high anti-glare property. The low refractive index layer 46 can have a high hardness and has a surface resistant to scratches. The anti-reflection film 20 with those layers is an optical film with high anti-glare property, high resistance to scratch, and high dust-proof and stain-proof property. Note that at least one of the optical functional layer 43 and the low refractive index layer 46 should contain light transmitting fine particles. As the optical functional layer 43 is a multi layer form constituted by plural layer components, at least one of those can contain light transmitting fine particles.

Examples of materials for the light transmitting fine particles include at least one oxide of titanium, zirconium, aluminum, indium, zinc, tin, and antimony. An average particle diameter of the metal oxides is 0.2 micron or less, preferably 0.1 micron or less, and desirably 0.06 micron or less. Specific examples of the oxides include $TiO_2$, $ZrO_2$, $Al_2O_3$, $In_2O_3$, ZnO, $SnO_2$, $Sb_2O_3$, ITO, and $SiO_2$. Desirable examples among those are $TiO_2$ and $ZrO_2$ in view of a high refractive index. Preferably, surfaces of the light transmitting fine particles can be treated with silane coupling agent and titanium coupling agent so as to improve dispersibility and compatibility in a binder. A ratio of the light transmitting fine particles of the addition is 10-90% relative to the total weight of a target layer for addition, and preferably 20-80%, and desirably 30-75%.

Particles for the purpose of anti-glare property are matte particles with an average particle diameter equal to or more than 1 micron and equal to or less than 10 microns and being larger than filler particles. Examples of matte particles include silica particles and titanium dioxide particles, and resin particles such as acrylic particles, cross-linking acrylic particles, polystyrene particles, cross-linking styrene particles, melamine resin particles, and benzoguanamine resin particles. Specifically preferable examples of matte particles include silica particles, cross-linking acrylic particles, cross-linking styrene particles. A form of the matte particles is not limited, and can be spherical or random. Two or more examples of matte particles may be used in combination with a difference in the particle diameter or shape. The content of the matte particles can preferably be equal to or more than 10 mg and equal to or less than 2,000 mg per sq. meter of the layer for the anti-glare functional layer. The content is desirably equal to or more than 100 mg and equal to or less than 1,400 mg.

It is preferable that matte particles are dispersed in the layer uniformly. As a size, matte particles can have an equal diameter. A ratio of large matte particles, which are included in those and have a diameter greater by 20% than their average diameter, should be equal to or lower than 1%, and desirably equal to or lower than 0.1%. Accordingly, the matte particles for use should be those after classification to a highest extent in the technique, for the purpose of the equal particle diameter and uniform dispersion in the layer. Note that particles for the adjusting the refractive index has a particle diameter of a smaller range than a particle diameter of those for imparting anti-glare property. No diffusion of light will occur upon transmission of the light, because the particles above have the diameter that is sufficiently smaller than the wavelength of light.

The optical functional layer can preferably contain at least one compound selected from fluorine compounds and silicone compounds having surface activity. This can impart performance to the optical functional layer with high dust-proofing and stain-proofing property and slipping property. An amount of the fluorine or silicone compound in all the solid content in the layer forming material is not limited, and is preferably 0.01-20 wt. % or more. The amount of the fluorine or silicone compound is specifically 0.05-10 wt. %, and desirably 0.1-5 wt. %.

Examples of fluorine compounds are such containing fluoroalkyl groups. Fluoroalkyl groups have preferably atomicity of 1-20 carbon atoms, and desirably atomicity of 1-10 carbon atoms. The fluoroalkyl groups may have structures of a straight chain, branched chain, alicyclic manner, and may contain an ether bond. Also, one molecule may contain two or more fluoroalkyl groups.

Preferable fluorine compounds are examples having a substitution group for property of compatibility and adhesion on the interface between the optical functional layer and the low refractive index layer. Examples of substitution groups may be two or more or only one. But the number of the substitution groups should be two or more. Preferable examples of substitution groups are acryloyl group, methacryloyl group, vinyl group, aryl group, cynnamoyl group, epoxy group, oxetanyl group, hydroxy group, polyoxyalkylene group, carboxyl group, and amino group. Such fluorine compounds may be a copolymer formed from a compound without a fluorine atom and a compound containing a fluorine atom, and may be an oligomer produced from monomers of plural examples. The molecular weight is not limited. An amount of the fluorine atom in the fluorine compounds is not limited, and is preferably 20 wt. % or more. The amount of the fluorine atom is specifically 30-70 wt. %, and desirably 40-70 wt. %.

Preferable silicone compounds are examples having a substitution group at an end group and side chain, or at any one of an end group and side chain of a compound chain which contains a plurality of dimethyl silyloxy as a repeating unit. Such a compound containing a repeating unit may contain a unit other than dimethyl silyloxy. Examples of substitution groups may be two or more or only one. But the number of the substitution groups should be two or more. Preferable examples of substitution groups are acryloyl group, methacryloyl group, vinyl group, aryl group, cynnamoyl group, epoxy group, oxetanyl group, hydroxy group, fluoroalkyl group, polyoxyalkylene group, carboxyl group, and amino group. A preferred molecular weight of the compound is 100,000 or less in view of easy handling. The molecular weight is preferably 50,000 or less, and desirably 3,000-30,000. An amount of silicon atoms in the silicone compounds is not limited, and is preferably 18 wt. % or more, specifically 25-37.8 wt. %, and desirably 30-37 wt. %.

Figure 3:
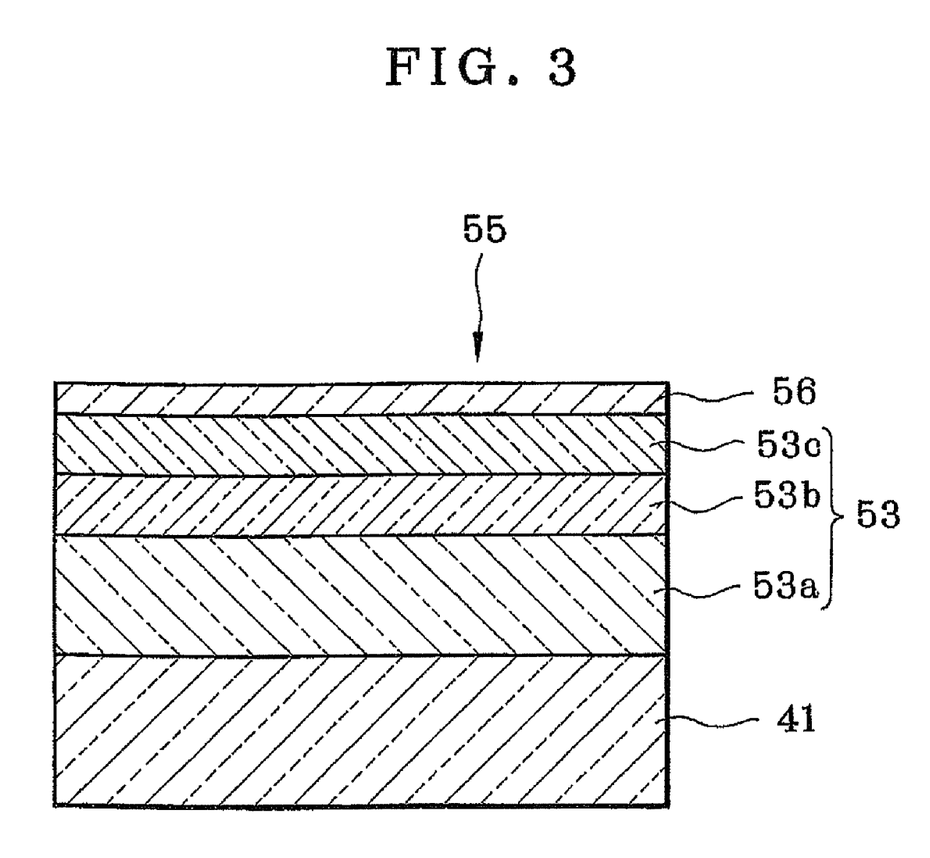
FIG. 3 is a cross section illustrating another preferred anti-reflection film.

In FIG. 3, another example of the anti-reflection film for production in the optical film producing system 10 is illustrated. In FIG. 3, anti-reflection film 55 includes the support 41, an optical functional layer 53 and a low refractive index layer 56. The numeral for the support 41 is equal to that described with FIGS. 2A and 2B. The optical functional layer 53 includes layer components, which are a first layer 53a, a second layer 53b and a third layer 53c overlaid in a sequence from a transparent support 51. The properties of the layers can be determined by suitably selecting the types of binders, fine particles and the like. An example of the first layer 53a is a hard coat layer. An example of the second layer 53b is a middle refractive index layer. An example of the third layer 53c is a high refractive index layer. According to this combination, the anti-reflection film 55 can be very high anti-reflection property.

In the above embodiment, the coating method is the gravure coating method. However, other coating methods known in the art can be used. Examples of coating methods include a dip coating method, an air-knife coating method, a curtain coating method, a roller coating method, a wire-bar coating method, a gravure coating method, e.g., a micro gravure coating method, or an extrusion coating method (See U.S. Pat. No. 2,681,294). Methods preferable among these are a wire-bar coating method, a micro gravure coating method, or an extrusion coating method. In particular, a micro gravure coating method is preferable.

The heater 18 of the embodiment has the two chambers. However, the split form of the heater 18 is not limited to the embodiment. Furthermore, a combination of plural dryers may be used, and may have adjusters for adjusting the inner temperature in a manner discrete from one another. Also, a set of plural dryers may be used, and may be disposed in series.

In the above embodiment, ultraviolet rays are applied for curing. Instead of this or in addition to this, an electron beam can be used for curing as ionizing radiation. To this end, a plurality of ionizing radiation sources such as ultraviolet source and an electron beam source can be used and disposed in series for application to the low refractive index layer. Note that the position, number and other features of those ionizing radiation sources can be determined suitably in the system.

Examples of ultraviolet radiation sources include high pressure mercury lamp, xenon lamp, metal halide lamp, fusion lamp, ultraviolet light emitting diodes (UV LEDs), and other devices well known in the art. Also, any of various types of sources for ionizing radiation can be used. Sufficient curing should be promoted in the radiation by reducing damage to the web or base film. An amount of the ultraviolet rays can be equal to or more than 30 mJ and equal to or less than 800 mJ, and preferably equal to or more than 50 mJ and equal to or less than 300 mJ. For ionizing radiation, accelerated electron pressure can be preferably equal to or more than 80 kV and equal to or less than 300 kV.

Various examples suggested in WO-A 2005-063484, pages 22 and 23 (corresponding to JP-A 2005-257786, paragraph 0061) are usable in combination with the invention, the examples including hardenable resins, fine particles, polymerization initiators, dispersion agents and other additives for forming supports, optical functional layers and low refractive index layers, and method of forming various layers.

The anti-reflection film of the invention can be used preferably as a protection film for the panel shaped polarizer. The panel shaped polarizer is constituted by two protection films between which the polarizer film is positioned. It is preferable to use the anti-reflection film of the invention as at least one of the protection films. This can reduce the manufacturing cost of the panel shaped polarizer because the anti-reflection film is used as the protection film. Also, the anti-reflection film is positioned as the uppermost layer. A panel shaped polarizer can be obtained with high resistance to scratches and high dust-proofing and stain-proofing properties, unwanted reflection of external light being prevented reliably. Furthermore, a first one of two protection films is preferably an anti-reflection film, a second one of them being the optical compensatory film having an optical anisotropic layer. Such an optical compensatory film can be provided with an optical functional layer having the optical anisotropic layer. The optical compensatory film is also referred to as a phase difference film, so as to improve the view angle property of the liquid crystal display panel.

As the anti-reflection film of the invention is used as a protective film for polarizing film, the anti-reflection film can be used in a liquid crystal display panels of any types, including TN type, STN type, VA type, IPS type, OCB type, and a transmission type, reflection type, and a transflective type.

A polarizing film in the invention may be any of known polarizing films, and polarizing films cut out from a continuous polarizing film whose absorption axis is neither parallel nor perpendicular to the longitudinal direction thereof. A polarizing film is obtained by stretching a continuously supplied polymer film by applying tension thereto while holding both two side ends of the film with tenter clips or other holding devices. In a preferred stretching method, the polarizing film is stretched at 1.1-20 times or more in the width direction of the film, at a speed difference of 3% or less between both ends of the film in the transport direction of the tenter clips or holding device, with bending the direction of advancing the film in a state where both ends of the film are held. The direction of advancing the film at the exit of the step of holding both ends of the film is inclined with respect to the direction in which the film is substantially stretched at an angle of 20-70 degrees. Note that this angle of inclination is preferably 45 degrees in view of high productivity.

The anti-reflection film of the invention can be used in a display panel of any of types of LCD, PDP (plasma display panel), ELD (electroluminescence display panel) and CRT (cathode ray tube). It is possible to attach the anti-reflection film with the transparent support to the display surface of the display panel by overlaying the transparent support on the display surface, so as to obtain the display panel with high image quality.

Also, WO-A 2005-063484, the portion starting from pages 43-44 (corresponding to JP-A 2005-257786, the portion starting from paragraph 0067) discloses examples of polarization films, polymer films, display panels and the like to which the anti-reflection film of the invention is applicable.

Experiments were conducted according to plural conditions of Examples 1-9 and Comparisons 1-7. Note that in Examples 2-9 and Comparisons 1-7, the basically used producing method of the Example 1 was repeated. Only their differences are described in detail.

Example 1

Production of Polymer Film

Triacetyl cellulose film TD80U manufactured by Fuji Photo Film Co., Ltd. was coated by the coater 14 with the solution A for forming an optical functional layer, which was then dried by the dryer 16 at 100 deg. C. for 40 seconds. The coater 14 included the doctor blade and the micro gravure roll 14a which had a diameter of 50 mm and a gravure pattern of 135 lines per inch and depth of 60 microns. The coater 14 was conditioned with a moving speed of 20 meters per minute. An air cool metal halide lamp (manufactured by Eyegraphics Co., Ltd.) of 160 W/cm was used under nitrogen purge. Ultraviolet rays were applied to the coating layer at the intensity of 400 mW per sq. cm and dose of 250 mJ per sq. cm, to obtain an optical film. The optical functional layer A being hardened was approximately 3.4 microns thick. The web or base film with the optical functional layer A was wound in a roll form, to obtain a roll of the web or base film as a light diffusion film.

[Production of Optical Film]

The optical film producing system 10 of FIG. 1 was used to produce an optical film. At first, a surface of the web or base film obtained above was coated by the coater 14 with the solution A for forming a low refractive index layer, which was then dried by the dryer 16 at 120 deg. C. for 150 seconds. The coater 14 included the doctor blade and the micro gravure roll 14a which had a diameter of 50 mm and a gravure pattern of 200 lines per inch and depth of 30 microns. The coater 14 was conditioned with a rotational speed of 30 rpm for the micro gravure roll 14a, and moving speed of 20 meters per minute. The first heating chamber 18a of the heater 18 was conditioned at 95 deg. C. The second heating chamber 18b of the heater 18 was conditioned at 105 deg. C. Time of drying of each of the heating chambers 18a and 18b was five (5) minutes to harden the coating layer. An air cool metal halide lamp (manufactured by Eyegraphics Co., Ltd.) of 240 W/cm was used under nitrogen purge as the ultraviolet curing lamp 21. Ultraviolet rays were applied to the coating layer by the ultraviolet curing lamp 21 at the intensity of 400 mW per sq. cm and dose of 900 mJ per sq. cm, to obtain an optical film. The low refractive index layer in the optical film was 100 nm (0.1 micron) thick.

[Solution A for Forming Optical Functional Layer]

The following compounds were mixed and stirred to prepare a mixed solution A1.

100 parts by weight of solution No. 1, zirconia-containing UV curing type hard coat solution DeSolite Z7404 (trade name), manufactured by JSR Corporation, having a solid content of 61 wt. %, content of zirconium dioxide (zirconia) of 70%, and containing components of polymerizable monomers and polymerization initiator;

30 parts by weight of solution No. 2, mixture of dipentaerythritol pentaacrylate and dipentaerythritol hexaacrylate, DPHA (trade name) manufactured by Nippon Kayaku Co., Ltd.;

21 parts by weight of methyl isobutyl ketone;

6 parts by weight of methyl ethyl ketone;

98 parts by weight of silane coupling agent A, acryloyl oxypropyl trimethoxy silane KBM-5103 (trade name), manufactured by Shin-Etsu Chemical Co., Ltd.

Triacetyl cellulose film TD80UF manufactured by Fuji Photo Film Co., Ltd. was coated with the mixed solution A1 to form a coating layer, which was cured by ultraviolet rays. The refractive index of the coating layer was measured and found 1.61.

Then 35 parts by weight of the particle dispersion liquid A was added to the mixed solution A1, the particle dispersion liquid A containing classification reinforced crosslinked PMMA particles (MXS-300 manufactured by Soken Chemical & Engineering Co., Ltd., with a refractive index of 1.49) having an average particle diameter of 3.0 microns. To the added solution, 90 parts by weight of the particle dispersion liquid B was added to obtain the mixed solution A2, the particle dispersion liquid B containing silica particles (SEAHOSTAR KE-P 150 manufactured by Nippon Shokubai Co., Ltd., with a refractive index of 1.46) having an average particle diameter of 1.5 microns. The mixed solution A2 was filtrated with a polypropylene filter with a pore diameter of 30 microns, to prepare the solution A for forming an optical functional layer or a hard coat layer with light diffusion. Note that the particle dispersion liquid A was a dispersion obtained by dispersing methyl isobutyl ketone dispersion in a Polytron homogenizer at 10,000 rpm for 20 minutes, the methyl isobutyl ketone dispersion containing 30 wt. % of the PMMA particles. The particle dispersion liquid B was a dispersion obtained by dispersing methyl ethyl ketone dispersion in the Polytron homogenizer at 10,000 rpm for 30 minutes, the methyl ethyl ketone dispersion containing 30 wt. % of the silica particles.

[Solution A for Forming Low Refractive Index Layer]

The following compounds were poured in a mixing tank, stirred, and then filtrated with a polypropylene filter with a pore diameter of 1 micron, to prepare a solution A for forming a low refractive index layer.

100 parts by weight of a polymer solution No. 1 of thermal crosslinkable fluorine-containing polymer, OPSTER JN-7228A manufactured by JSR Corporation;

4.3 parts by weight of silica dispersion A or silica sol of nanoparticles, manufactured by Nissan Chemical Industries Ltd., MEK-ST with an average particle diameter of 15 nm;

5.1 parts by weight of silica dispersion B or silica sol of nanoparticles, manufactured by Nissan Chemical Industries Ltd., variant of MEK-ST with an average particle diameter of 45 nm;

2.2 parts by weight of sol solution E, to be described later;

15.0 parts by weight of methyl ethyl ketone;

3.6 parts by weight of cyclohexanone.

[Sol Solution E]

A reactor had a stirrer and a countercurrent cooler. The reactor was supplied with 120 parts by weight of methyl ethyl ketone, 100 parts by weight of silane coupling agent A, and 3 parts by weight of diisopropoxy aluminum ethyl acetoacetate (manufactured by Hope Chemical Co., Ltd.). Those were mixed up to obtain a mixture. 30 parts by weight of ion exchange water was added to the mixture for reaction of four (4) hours at 60 deg. C. Then the mixture was cooled at a room temperature to obtain the sol solution E. The sol solution E had the weight average molecular weight of 1,800. A component in the sol solution E of which a molecular weight is 1,000-20,000 over as oligomer or polymer was 100 wt. %. Analysis of gas chromatography was conducted to find that no component of silane coupling agent A as raw material existed in the sol solution E.

Example 2

Example 1 was repeated to produce optical film, with a difference of conditioning the second heating chamber 18b at 110 deg. C.

Example 3

The optical film was produced by steps which will be described next, and coated with the solution B for the low refractive index layer, which was dried to obtain optical film. For the process of forming the optical film, Example 1 was repeated.

[Production of Polymer Film]

The triacetyl cellulose film the same as that of Example 1 was coated with a solution B for the optical functional layer by use of a micro gravure roll of 50 mm in diameter having a gravure pattern with a line number of 110 lines per inch and a depth of 65 microns and a doctor blade, under the conditions of a gravure roll rotational speed of 45 rpm and a transport speed of 30 meters per minute, and the coating was dried at 60 deg. C. for 150 seconds. Thereafter, ultraviolet rays of intensity of 400 mW per sq. cm and dose of 200 mJ per sq. cm was irradiated by use of an air cool metal halide lamp of 160 W/cm (manufactured by Eyegraphics Co., Ltd.) under nitrogen purge, to cure the solution B for the optical functional layer. So the optical functional layer B as anti-glare hard coat layer was formed. The optical functional layer B being hardened was 6 microns thick. The web or base film with the optical functional layer B was wound in a roll form, to obtain a roll of the web or base film as an anti-glare hard coat film.

[Solution B for Forming Optical Functional Layer]

The following compounds were mixed.

50 parts by weight of solution No. 3, namely mixture of penta erythritol triacrylate and penta erythritol tetraacrylate, PETA manufactured by Nippon Kayaku Co., Ltd.;

38.5 parts by weight of toluene;

2 parts by weight of polymerization initiator A, Irgacure 184 manufactured by Ciba Specialty Chemicals Inc.

The mixture was stirred, to prepare the mixed solution B1. Triacetyl cellulose film TD80UF manufactured by Fuji Photo Film Co., Ltd. was coated with the mixed solution B to form a coating layer, which was cured by ultraviolet rays. The refractive index of the coating layer was measured and found 1.51.

Then 1.7 parts by weight of the particle dispersion liquid C was added to the mixed solution B1, the particle dispersion liquid C containing polystyrene particles (SX-350 manufactured by Soken Chemical & Engineering Co., Ltd., with a refractive index of 1.60) having an average particle diameter of 3.5 microns. To the added solution, 13.3 parts by weight of the particle dispersion liquid D was added to obtain the mixed solution B2, the particle dispersion liquid D containing acryl styrene particles (manufactured by Soken Chemical & Engineering Co., Ltd., with a refractive index of 1.55) having an average particle diameter of 3.5 microns. To the mixed solution B2, 0.75 part by weight of a fluorine type surface reforming agent (FP-13, with a weight average molecular weight of 14,000 according to paragraph 0080 of JP-A 2005-283849), and 10 parts by weight of silane coupling agent A were added, to obtain a solution B for the low refractive index layer as anti-glare hard coat layer. Note that the particle dispersion liquid C was a dispersion obtained by dispersing mixed liquid of toluene in a Polytron homogenizer at 10,000 rpm for 20 minutes, the mixed liquid containing toluene and 30 wt. % of the polystyrene particles. Note that the particle dispersion liquid D was a mixed liquid containing toluene and 30 wt. % of the acryl styrene particles.

[Solution B for Forming Low Refractive Index Layer]

The following compounds were poured in a mixing tank, stirred, and then filtrated with a polypropylene filter with a pore diameter of 1 micron, to prepare a solution B for forming a low refractive index layer.

100 parts by weight of a polymer solution No. 2 of thermal crosslinkable fluorine-containing polymer, OPSTER JTA-113 manufactured by JSR Corporation;

4.3 parts by weight of the silica dispersion A;

5.1 parts by weight of the silica dispersion B;

2.2 parts by weight of the sol solution E;

15.0 parts by weight of methyl ethyl ketone;

3.6 parts by weight of cyclohexanone.

Example 4

Example 3 was repeated to produce optical film, with a difference of conditioning the second heating chamber 18b at 110 deg. C.

Example 5

Example 3 was repeated with a difference in that the solution C for forming the low refractive index layer was used, and that the second heating chamber 18b was conditioned at 100 deg. C. An optical film was produced.

[Solution C for Forming Low Refractive Index Layer]

The following compounds were poured in a mixing tank, and stirred to obtain mixed solution, which was filtrated with a polypropylene filter with a pore diameter of 1 micron, to prepare the solution C for forming a low refractive index layer.

100 parts by weight of polymer solution No. 2;

4.3 parts by weight of the silica dispersion A;

5.1 parts by weight of the silica dispersion B;

2.2 parts by weight of the sol solution E;

10.0 parts by weight of methanol;

5.0 parts by weight of methyl ethyl ketone;

3.6 parts by weight of cyclohexanone.

Example 6

Example 3 was repeated to produce optical film, with a difference of using the solution C for the low refractive index layer.

Example 7

Example 3 was repeated to produce optical film, with a difference of using the solution C for the low refractive index layer, and conditioning the second heating chamber 18b at 100 deg. C.

Example 8

Example 3 was repeated with a difference in that the solution C for forming the optical functional layer was used. A base film having the optical functional layer C as an anti-glare hard coat layer was produced. Then Example 1 was repeated with a difference in that the solution B for forming the low refractive index layer was used. An optical film as high refractive index film was produced. The thickness of the optical functional layer C after being hardened was 6 microns.

[Solution C for Forming Optical Functional Layer]

The following compounds were poured in a mixing tank, and stirred to obtain mixed solution, which was filtrated with a polypropylene filter with a pore diameter of 0.4 micron, to prepare the solution C for forming an optical functional layer with a high refractive index.

88.9 parts by weight of titanium dioxide dispersion;

58.9 parts by weight of the solution No. 2;

3.1 parts by weight of polymerization initiator B, Irgacure 907 manufactured by Ciba Specialty Chemicals Inc.;

1.1 parts by weight of photosensitizer Kayacure DETX, manufactured by Nippon Kayaku Co., Ltd.;

482.4 parts by weight of methyl ethyl ketone;

1,869.8 parts by weight of cyclohexanone.

The titanium dioxide dispersion was prepared by the following method.

[Titanium Dioxide Dispersion]

The dispersion was prepared by dispersing the following materials by Dyno Mill for a weight average particle diameter of 70 nm.

257.1 parts by weight of fine particle dispersion F (MPT-0129C manufactured by Ishihara Sangyo Kaisha, Ltd., containing $TiO_2$, $Co_3O_4$, $Al_2O_3$ and $ZrO_2$ at a weight ratio of 90.5:3.0:4.0:0.5);

38.6 parts by weight of the dispersing agent A;

704.3 parts by weight of cyclohexanone.

Example 9

Example 8 was repeated to produce optical film, with a difference of conditioning the second heating chamber 18b at 110 deg. C.

Comparison 1

Example 1 was repeated to produce optical film, with a difference in no use of the heater 18. A heater having only one chamber was used for heating in place of the heater 18. The polymer film having the coating layer was heated by the heater at the temperature of 105 deg. C. for 10 minutes.

Comparison 2

Example 3 was repeated to produce optical film, with a difference in no use of the heater 18. A heater having only one chamber was used for heating in place of the heater 18. The polymer film having the coating layer was heated by the heater at the temperature of 105 deg. C. for 10 minutes.

Comparison 3

Example 5 was repeated to produce optical film, with a difference in no use of the heater 18. A heater having only one chamber was used for heating in place of the heater 18. The polymer film having the coating layer was heated by the heater at the temperature of 95 deg. C. for 10 minutes.

Comparison 4

Example 5 was repeated to produce optical film, with a difference in no use of the heater 18. A heater having only one chamber was used for heating in place of the heater 18. The polymer film having the coating layer was heated by the heater at the temperature of 100 deg. C. for 10 minutes.

Comparison 5

Example 5 was repeated to produce optical film, with a difference in no use of the heater 18. A heater having only one chamber was used for heating in place of the heater 18. The polymer film having the coating layer was heated by the heater at the temperature of 105 deg. C. for 10 minutes.

Comparison 6

Example 5 was repeated to produce optical film, with a difference in no use of the heater 18. A heater having only one chamber was used for heating in place of the heater 18. The polymer film having the coating layer was heated by the heater at the temperature of 108 deg. C. for 10 minutes.

Comparison 7

Example 8 was repeated to produce optical film, with a difference in no use of the heater 18. A heater having only one chamber was used for heating in place of the heater 18. The polymer film having the coating layer was heated by the heater at the temperature of 105 deg. C. for 10 minutes.

Evaluation was conducted for the optical film produced according to the examples and comparisons. To this end, samples were saponified optical film obtained according to the saponification as follows.

[Saponification]

At first, aqueous solution of sodium hydroxide of 1.5 mol per liter was prepared, and kept at 55 deg. C. Also, aqueous solution of diluted sulfuric acid of 0.01 mol per liter was prepared, and kept at 35 deg. C. The optical film was immersed in this aqueous solution of sodium hydroxide for two (2) minutes, and then immersed in water for washing away the sodium hydroxide. After this, the washed optical film was immersed in the diluted sulfuric acid for one (1) minutes, and then immersed in water for washing away the diluted sulfuric acid. The optical film was dried by a dryer conditioned at 120 deg. C., and was saponified.

[1. Average Reflectance]

A spectrophotometer U4100 manufactured by Hitachi Seisakusyo Inc. was used to measure spectral reflectance of the samples in the wavelength range of 380-780 nm (visible light) at the incidence angle of 5 degrees. The average reflectance of 450-650 nm was obtained as an average reflectance of the optical film.

[2. Evaluated Resistance to Scratch]

A rubbing test was carried out for the samples under the condition to be described next, by use of the vibrating type of friction fastness rubbing tester AB-301 (trade name, manufactured by Tester Sangyo Co., Ltd.) of JSPS type (Japan Society of the Promotion of Science). Then a second surface of the samples reverse to a first surface having the low refractive index layer was coated with black ink of an oil base. The first surface was observed by human eyes, so scratches of rubbed portions found with reflected light were evaluated with three grades as resistance of the optical film to scratch.

A: Completely acceptable as product, because of no scratches even when observed very carefully.

B: Acceptable as product, because only very slight scratches were found.

F: Unacceptable as product, because apparently recognizable scratches were found.

[Conditions of Rubbing Test]

Environmental condition: 25 deg. C., 60% RH;

Rubbing tool: A testing end of 1×1 cm of a tester for contact with a sample was wrapped by a winding of Bemcot M-3 (manufactured by Asahi Kasei Corporation), and was fixed with a band.

Moving distance: 13 cm for one way;

Rubbing speed: 13 cm per second;

Load: 200 grams per sq. cm;

Contact area of the end: 1×1 cm;

Number of times of rubbing: 250 as combinations of back and forth directions.

[3. Accidental Creation of White Powder]

A second surface reverse to the first surface having the low refractive index layer was coated with oil-based black ink. Then light from a light source was applied to the first surface. Failure with white powder recognizable on the first surface with human eyes was evaluated by the following three grades. The light source was a three wavelength fluorescent lamp and a synthetic solar light lamp.

A: Completely acceptable as product, because of no failure with white powder.

B: Acceptable as product, because only very slight white powder was found.

F: Unacceptable as product, because failure with white powder was found on the whole surface.

Results of the evaluation according to the examples and comparisons are indicated in Tables 1 and 2.

TABLE 1

| | Solution for forming functional layer | Solution for forming low refracttive index layer | Average reflectance (%) | Resistance to scratch | Accidental creation of white powder |
|---|---|---|---|---|---|
| Example 1 | A | A | 1.4 | A | A |
| Example 2 | A | A | 1.4 | A | A |
| Example 3 | B | B | 1.2 | A | A |
| Example 4 | B | B | 1.2 | A | A |
| Example 5 | B | C | 1.2 | A | A |
| Example 6 | B | C | 1.2 | A | A |
| Example 7 | B | C | 1.2 | A | A |
| Example 8 | C | B | 0.8 | A | A |
| Example 9 | C | B | 0.8 | A | A |

TABLE 2

| | Solution for forming functional layer | Solution for forming low refracttive index layer | Average reflectance (%) | Resistance to scratch | Accidental creation of white powder |
|---|---|---|---|---|---|
| Comparison 1 | A | A | 1.4 | A | F |
| Comparison 2 | B | B | 1.2 | A | F |
| Comparison 3 | B | C | 1.2 | F | A |
| Comparison 4 | B | C | 1.2 | B | A |
| Comparison 5 | B | C | 1.2 | A | B |
| Comparison 6 | B | C | 1.2 | A | F |
| Comparison 7 | C | B | 0.8 | A | F |

In conclusion, optical film was found produced at a high productivity and with high quality, for example high average reflectance, high resistance to scratches, and suppressed failure in the appearance such as white powder dust.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An anti-reflection film producing method of producing anti-reflection film including a transparent support, at least one optical functional layer overlaid on said support, and a low refractive index layer, overlaid on said optical functional layer, and having a lower refractive index than said optical functional layer, said anti-reflection film producing method comprising:
   a coating step of coating a surface of said optical functional layer with liquid for forming said low refractive index layer, to form a coating layer;
   a drying step of promoting drying of said coating layer;
   a hardening step of thermally hardening said coating layer after promoting of drying, to form said low refractive index layer;
   said hardening step including:
   a first heating step of heating said coating layer at a first temperature level for hardening;
   a second heating step of heating said coating layer at a second temperature level for hardening higher than said first temperature; and
   wherein said first temperature level is equal to or higher than 70 deg. C. and equal to or lower than 110 deg. C.; and
   wherein said second temperature level is equal to or higher than 100 deg. C. and equal to or lower than 160 deg. C.

2. An anti-reflection film producing method as defined in claim 1, further comprising a step of applying ionizing radiation to said low refractive index layer after said hardening step.

3. An anti-reflection film producing method as defined in claim 2, wherein a difference between said first and second temperature levels is equal to or higher than 1 deg. C. and equal to or lower than 50 deg. C.

4. An anti-reflection film producing method as defined in claim 3, wherein in said drying step, dry gas is blown to said coating layer;
   in said first and second heating steps, heated gas conditioned at respectively said first and second temperature levels is blown to said coating layer.

5. An anti-reflection film producing method as defined in claim 3, wherein said optical functional layer contains at least one of a fluorine compound and a silicone compound, said fluorine compound and said silicone compound having surface activity.

6. An anti-reflection film producing method as defined in claim 5, wherein said optical functional layer is an anti-glare functional layer.

7. An anti-reflection film producing method as defined in claim 5, wherein said optical functional layer has a refractive index equal to or more than 1.58 and equal to or less than 2.0.

8. An anti-reflection film producing method as defined in claim 7, wherein said low refractive index layer has a refractive index equal to or more than 1.31 and equal to or less than 1.45.

9. An anti-reflection film producing method as defined in claim 7, wherein said anti-reflection film further includes light transmitting fine particles contained in at least one of said optical functional layer and said low refractive index layer.

10. An anti-reflection film producing method as defined in claim 3, wherein said at least one optical functional layer is at least first and second layers positioned in a sequence from said support.

11. An anti-reflection film producing method as defined in claim 10, wherein said anti-reflection film further includes light transmitting fine particles contained in said second layer.

12. The anti-reflection film producing method as defined in claim 3, wherein said at least one optical functional layer is at least first to third layers positioned in a sequence from said support.

13. An anti-reflection film producing method as defined in claim 3, wherein in each of said first and second heating steps, a plurality of transport rollers are used to guide a web of said anti-reflection film with a U-shaped bend for transport of said web.

* * * * *